(12) United States Patent
Thiruvenkatanathan et al.

(10) Patent No.: US 9,551,576 B2
(45) Date of Patent: Jan. 24, 2017

(54) MEMS INERTIAL SENSOR AND METHOD OF INERTIAL SENSING

(71) Applicant: Cambridge Enterprise Limited, Cambridge (GB)

(72) Inventors: Pradyumna Thiruvenkatanathan, London (GB); Ashwin Seshia, Cambridge (GB)

(73) Assignee: Cambridge Enterprise Limited, Cambridge (GB)

(*) Notice: Subject to any disclaimer, the term of this patent is extended or adjusted under 35 U.S.C. 154(b) by 116 days.

(21) Appl. No.: 14/360,182

(22) PCT Filed: Nov. 22, 2012

(86) PCT No.: PCT/GB2012/052891
§ 371 (c)(1),
(2) Date: May 22, 2014

(87) PCT Pub. No.: WO2013/076490
PCT Pub. Date: May 30, 2013

(65) Prior Publication Data
US 2014/0305208 A1    Oct. 16, 2014

(30) Foreign Application Priority Data
Nov. 23, 2011   (GB) .................................. 1120198.5

(51) Int. Cl.
*G01P 15/097* (2006.01)
*G01C 19/5712* (2012.01)
*G01C 19/5719* (2012.01)

(52) U.S. Cl.
CPC ....... *G01C 19/5712* (2013.01); *G01C 19/5719* (2013.01); *G01P 15/097* (2013.01)

(58) Field of Classification Search
CPC ......................... G01P 15/097; G01C 19/5719
(Continued)

(56) References Cited

U.S. PATENT DOCUMENTS 6,915,693 B2    7/2005  Kim et al.
6,918,298 B2    7/2005  Park
(Continued)

FOREIGN PATENT DOCUMENTS

EP    1624285        2/2006
WO    WO2008005389   1/2008
(Continued)

OTHER PUBLICATIONS

Thiruvenkatanathan, P., "Ultrasensitive Mode-Localized Micromechanical Electrometer." IEEE p. 91-96, 2010.
(Continued)

*Primary Examiner* — John Chapman, Jr.
(74) *Attorney, Agent, or Firm* — John B. Hardaway, III; Nexsen Pruet, LLC

(57) ABSTRACT

The invention comprises an inertial sensor comprising a frame, a proof mass, a first resonant element, the first resonant element being fixed to the frame and electrostatically coupled to the proof mass, and a second resonant element, the second resonant element being fixed to the frame, adjacent to the first resonant element such that there is substantially no electrostatic coupling between the second resonant element and the proof mass. A coupling is provided between the first resonant element and the second resonant element. A drive means is coupled to the first and second resonant elements for vibrating the first and second resonant elements and a sensor assembly is provided for detecting the amplitude of vibration of at least one of the resonant elements.

18 Claims, 9 Drawing Sheets

(58) Field of Classification Search
USPC .................................................. 73/514.29
See application file for complete search history.

(56) References Cited

U.S. PATENT DOCUMENTS

| | | | |
|---|---|---|---|
| 7,289,875 | B2 | 10/2007 | Recktenwald et al. |
| 7,318,348 | B2 | 1/2008 | Ogino et al. |
| 7,648,036 | B2 | 1/2010 | Recktenwald |
| 7,650,238 | B2 | 1/2010 | Reynolds |
| 7,726,188 | B2 | 6/2010 | Cardarelli |
| 7,938,004 | B1 | 5/2011 | Brunsch et al. |
| 7,990,806 | B2 | 8/2011 | Chen |
| 7,994,971 | B2 | 8/2011 | Velde et al. |
| 8,105,532 | B2 | 1/2012 | Harmon et al. |
| 8,106,811 | B2 | 1/2012 | Vander Velde et al. |
| 8,201,625 | B2 | 6/2012 | Almaguer |
| 8,424,383 | B2 | 4/2013 | Wang et al. |
| 9,261,525 | B2 * | 2/2016 | Thiruvenkatanathan    G01C 19/5726 |
| 2009/0280910 | A1 | 11/2009 | Gagner et al. |
| 2011/0185829 | A1 | 8/2011 | Sugita et al. |

FOREIGN PATENT DOCUMENTS

| | | |
|---|---|---|
| WO | WO2009048621 | 4/2009 |
| WO | WO2011148137 | 12/2011 |

OTHER PUBLICATIONS

Nickitas-Etienne, Athina, International Preliminary Report on Patentability—PCT/GB2012/052891—May 27, 2014.

* cited by examiner

MEMS INERTIAL SENSOR AND METHOD OF INERTIAL SENSING

FIELD OF THE INVENTION

The present invention relates to inertial sensors and methods of inertial sensing using microscopic mechanical inertial sensors.

BACKGROUND TO THE INVENTION

Accelerometers and gyroscopes are in wide use today for a variety of motion sensing applications ranging from inertial navigation to vibration monitoring. Accelerometers measure changes in acceleration (linear or rotational) while gyroscopes provide information about angular motion (rotation). These devices use the inertial properties of light or matter for their operation and have hence been broadly classified as 'inertial sensors'.

Inertial sensors have traditionally served navigation markets. Macroscale gyroscopes and accelerometers are used to provide information about the position, orientation and velocity for aircraft and naval vessels. They have also been incorporated into control systems that are used for robotic applications, such as missile guidance, unmanned aircraft, and industrial machine control. Commercial inertial navigation grade sensors are available from Honeywell Corporation, Northrop Gumman and Naysys Corporation, amongst others.

While these macroscopic accelerometers and gyroscopes still remain the premier instruments for inertial grade navigation systems, microscopic mechanical inertial sensors fabricated using MEMS technology have been perceived as a breakthrough in inertial navigation and motion sensing, due to the substantial reduction in cost, size and power that may be achieved in such micromechanical sensors relative to their macroscopic counterparts. These attributes have enabled the use of such inertial sensors in a variety of applications that have traditionally not been possible due to either their prohibitive cost or size restrictions, for example, in mobile phones, MP3 players, PDAs, notebooks, surgical instruments etc. Commercial MEMS inertial sensors are now available from Analog Devices Inc., Motorola, ST Microelectronics and Silicon sensing systems amongst several others.

Micro-machined MEMS resonant accelerometers and gyroscopes are well known in prior art. See for example, U.S. Pat. No. 7,640,803, CN101303365 and U.S. Pat. No. 5,969,249. Most of the disclosed MEMS resonant inertial sensors respond to acceleration or angular rotation by producing a frequency shifted output signal arising from an oscillating unit incorporated as a part of the sensor.

Thiruruvenkatanathan et al, in a paper entitled "Ultrasensitive mode-localized micromechanical electrometer", Frequency control symposium (FCS), 2010 IEEEInternational, IEEE, Piscataway, N.J., USA, 1 Jun. 2010, describes a MEMS resonant sensor based on mode localization. The system described relies on weakly coupled resonant elements in which one resonant element is fixed to a suspended mass. Movement of the suspended mass introduces a differential axial strain on the resonant element to which it is mechanically fixed, leading to a change in the modal response of the weakly coupled resonant elements. This mode shape variation was proposed as a new sensing mechanism for the realization of inertial sensors that were based on measuring induced strain as a function of an input inertial force.

However, a measure of strain in such inertial sensor implementations necessitates the use of compliant resonator topologies that require operation in a low pressure (vacuum) environment in order to provide for sufficiently high quality factors and hence sufficiently high resolution for most commercial applications. This consequently imposes stringent limitations on the packaging of these sensors and consequently, increases the cost of manufacture. It is an object of this invention to overcome these disadvantages by allowing for the realization of a mode-localized MEMS resonant sensor with sufficient resolution that is operable at atmospheric pressures.

SUMMARY OF THE INVENTION

The present invention is defined in the appended independent claims, to which reference should now be made.

The present invention proposes an alternative approach to mode-localized inertial sensing by deducing an acceleration/rotation rate input through a direct transduction of an inertial displacement, rather than an induced differential strain. This approach, whilst offering the advantages of improvements in signal sensitivity and enhanced environmental robustness (relative to the more traditional frequency-shift based sensors) as in the case of the strain modulated mode-localized sensors, also offers two additional key benefits:

(1) The design of mode-localized inertial sensors is no longer constrained by the resonator topology, consequently enabling the production of mode-localized MEMS sensors with stiffer coupled resonator platforms incorporated that are operable in air with sufficient resolution;

(2) Further potential improvements in signal sensitivity relative to the strain modulated case with increased electrical tunability.

In a first aspect, the invention comprises an inertial sensor comprising:
a frame;
a proof mass suspended from the frame by at least one flexure;
a first resonant element, the first resonant element being fixed to the frame and electrostatically coupled to the proof mass;
a second resonant element, the second resonant element being fixed to the frame, adjacent to the first resonant element such that there is substantially no electrostatic coupling between the second resonant element and the proof mass;
a coupling between the first resonant element and the second resonant element;
a drive means coupled to the first and second resonant elements for vibrating the first and second resonant elements; and
a sensor assembly for detecting the amplitude of vibration of at least one of the resonant elements.

Preferably, the first and second resonant elements are of substantially the same dimensions and material properties.

A sensor in accordance with the invention uses a measure of mode localisation in the coupled resonators as a result of displacement of the proof mass. Preferably the first resonant element is capacitively coupled to the proof mass. The use of parallel-plate capacitive coupling between the proof mass and the first resonant element provides a non-linear relationship between displacement of the proof mass and mode localisation in the coupled resonators. The non-linear relationship allows for improved measurement sensitivity relative to the case wherein the inertial force is monitored by measuring the induced strain on one of the resonant elements by mechanically coupling it to the proof mass. Alternatively, the first resonant element may be coupled to the proof mass using alternate electro-elastic coupling arrangements.

A particular advantage of such an electrostatic coupling between the proof mass and the first resonant element is that the output mode shape variation in such a configuration becomes independent of the stiffness of the resonant elements used. This consequently, relaxes the design restrictions in terms of the resonator topologies employed thereby enabling the incorporation of alternative resonant elements with a very high quality factor that are operable in air. Therefore, the first and second resonant elements may advantageously be bulk acoustic resonators. Bulk acoustic resonators operate in longitudinal mode and suffer less from air damping than flexural mode resonant elements. Bulk acoustic resonators are typically much stiffer than flexural mode resonators of comparable dimensions, such as tuning fork resonators (that are often employed for the realization of strain modulated mode-localized sensors). However, it is to be noted that this configuration facilitates the use of any suitable resonant elements as stated previously. Another advantage of electrostatic coupling between the proof mass and the first resonant element is that the stiffness of the first resonant element in such a configuration does not affect the motion of the proof mass. So resonant elements with a very high stiffness, operable in air, can be used, without adversely affecting the ability of the proof mass to freely displace.

A sensor in accordance with the present invention comprises two key elements—a 'proof mass' (usually a pendulously suspended mass that moves in response to an inertial force imposed on the sensor e.g., in response to an acceleration) and an array of (i.e. two or more) weakly coupled, preferably substantially identical, resonators with one of the resonant units alone electrostatically coupled to the proof mass.

An inertial force input on the sensor displaces the proof mass relative to the first resonant element. The displacement changes the electrostatic coupling, thereby modulating the stiffness of the first resonating element, without altering the stiffness of the other coupled resonating units. The variations in the eigenstates (which refer to the relative amplitudes at the resonant frequencies measured from each of the resonators) due to such induced stiffness modulation, yields a measure of the inertial force on the sensor. Measuring such eigenstate variations induced by mode localization offers a number of key advantages over conventional resonant frequency shift based measurements:

(1) insensitivity to unwanted environmental variations;

(2) orders of magnitude enhancement in the output sensitivity and consequently, the resolution of such sensors;

(3) Relative independence of the output sensitivity on the stiffness of the resonant elements used, allowing the use of much stiffer resonators (and consequently, improved design flexibility).

(4) Reduced restrictions on the packaging requirements and therefore, the cost of manufacture of the sensors through the incorporation of alternative coupled resonator configurations that are operable at atmospheric pressures with sufficiently high quality factors.

(5) Improved electrical tunability of the output sensitivity that allows for enhanced dynamic electrical calibration of the sensor.

Preferably, the means for coupling the first resonant element to the second resonant element is an electrostatic coupling means. This allows the coupling strength between the resonant elements to be very weak and to be electrically tuned. The weaker the coupling, the more pronounced the mode localisation. It also allows any minor mechanical differences between the resonant elements to be compensated for. Compensation for minor mechanical differences between the resonant elements may also be provided by separate polarisation electrodes, adjacent to the resonant elements, allowing for voltage tuning of the sensor to symmetry without altering the strength of the electrostatic coupling.

The electrostatic coupling means may be the application of different DC voltages to each of the resonant elements. The coupling may take the form of a pair of plates, one plate in the pair of plates coupled to or forming part of the first resonant element and the other plate in the pair of plates coupled to or forming part of the second resonant element, and a voltage source connected to the pair of plates for applying a voltage difference between the plates.

Alternatively, the means for coupling may be a mechanical linkage between the first resonant element and the second resonant element. Preferably, the mechanical linkage is positioned at or close to a nodal point of vibration of the resonant elements (i.e. a point of minimum kinetic energy). Preferably, the mechanical linkage is integrally formed with the first and second resonant elements.

Whichever means of coupling is used, the coupling preferably has an effective stiffness of less than half of the stiffness of both the first and second resonant elements. The weaker the coupling between resonant elements is, the greater the sensitivity of the sensor. However, the weaker the coupling is between the resonant elements the closer the resonant modes are in frequency. The coupling must therefore be non-zero and sufficient for each resonant mode to be resolvable from each other. In other words the coupling must be strong enough that there is no modal overlap in the coupled response of the system.

The drive means preferably comprises a first drive electrode coupled to the first resonant element for exciting the first resonant element. The drive means may further comprise a second drive electrode coupled to the second resonant element for exciting the second resonant element. Alternatively, a single drive electrode may be used to excite both of the resonant elements.

The sensor assembly may comprise capacitive sensors positioned adjacent the first and second resonant elements or resistive sensors coupled to the first and second resonant elements to detect the amplitude of vibration of the sensors. In case of a capacitive transduction scheme, the sensors may take the form of electrodes positioned adjacent to the first and second resonant elements. A DC bias voltage can be applied to the sense electrodes. The DC bias forms part of the drive means.

Preferably, the inertial sensor further comprises processing electronics for determining the modal behaviour of the coupled resonant elements. In case of a two resonator configuration, the electronics may be configured to determine a ratio of the amplitude of oscillation of the first resonant element and the amplitude of oscillation of the second resonant element. However, advantageously, if the amplitude of oscillation of one of the resonant elements is controlled and maintained at a constant level, then it is only necessary to measure the amplitude of oscillation of the other resonant element. The amplitude ratio or amplitude can be used to provide a measure of the stiffness modulation on the first resonant element, and so a measure of the displacement of the proof mass relative to the first resonant element.

Preferably, the inertial sensor further comprises at least one lever between the proof mass and the first resonant element. The lever can be used to amplify the displacement of a portion of the proof mass relative to the first resonant element and so amplify the stiffness modulation experienced by the first resonant element as a result of movement of the proof mass.

One or more additional resonant elements fixed to the frame adjacent to the first and second resonant elements may be included in the inertial sensor, but with only the first resonant element coupled to the proof mass. All of the resonant elements are coupled to one another to form an array or chain of coupled elements. All of the resonant elements are preferably substantially identical. The more resonant elements are included in the array, the greater the mode localisation resulting from a small perturbation in stiffness in the first resonant element and so the greater the amplitude ratio and resolution of the sensor. However, the more resonant elements there are, the greater the noise in the system and so a balance must be struck. It is anticipated that for most purposes, two resonant elements will be sufficient. If more than two resonant elements are included, the amplitude of vibration of each element is measured and compared to the amplitude of vibration of the first resonant element at one of the resonant frequencies. Alternatively, the amplitude of vibration of one resonant element may be maintained at a constant level and the amplitudes of vibration of the other resonant elements may be measured and compared at one of the resonant frequencies.

The inertial sensor so far described provides for measurement of acceleration or displacement along one axis. However, the same principles can be applied to provide a two or three dimensional inertial sensor, either by providing two/three orthogonal but entirely separate sensors in a single package or by providing suitable sensor configurations that all share the same proof mass.

For example, to provide sensing in a second dimension the inertial sensor may further comprise:

a third resonant element, the third resonant element being fixed to the frame and electrostatically coupled to the proof mass;

a fourth resonant element, the fourth resonant element being fixed to the frame, adjacent to the third resonant element; and a second means for coupling the third resonant element to the fourth resonant element;

wherein the third resonant element extends from the proof mass in the same direction or a direction orthogonal to the direction at which the first resonant element extends from the proof mass.

A further pair or array of coupled resonant elements may be provided in a third orthogonal direction, with one of the resonant elements electrostatically coupled to the proof mass, in order to provide a three dimensional inertial sensor.

An inertial sensor in accordance with the invention may also be used as a gyroscope. In a gyroscope in accordance with the invention, the proof mass may be coupled to the first resonant element by an intermediate frame, the intermediate frame being coupled to the first resonant element by flexures that transmit movement resulting from the Coriolis force on the proof mass orthogonal to a drive direction, but not movement in the drive direction. The Coriolis force on the proof mass may be calculated from a measured amplitude of oscillation (or from the ratio of amplitudes of oscillation of the resonant elements), and from the Coriolis force, the angular velocity of the sensor can be calculated.

In a second aspect, the invention is a method of inertial sensing using a sensor comprising a proof mass coupled to a first resonant element, wherein a second resonant element is coupled to the first resonant element but not to the proof mass, comprising the steps of:

oscillating the first and second resonant elements with a drive signal of the same amplitude;

detecting an amplitude of oscillation of one of the first or second resonant elements at resonance; adjusting the drive signal to maintain the amplitude of oscillation of one of the first and second resonant elements at a constant amplitude;

detecting an amplitude of oscillation of the other of the first and second resonant elements at resonance; and determining the displacement of the proof mass based on the amplitude of the other of the first and second resonant elements.

The sensor may be a sensor in accordance with the first aspect of the invention.

The drive signal advantageously has a frequency at one of the fundamental frequencies of vibration of the coupled system.

By keeping the amplitude of one resonant element fixed, only the amplitude of the other resonant element needs to be measured. This significantly reduces the electronic noise injected into the system in the determination of the displacement of the proof mass when compared to a method in which two amplitude measurements are compared using a ratiometric amplifier.

Preferably, the means for coupling the first resonant element to the second resonant element is an electrostatic coupling, and the method further comprises the step of applying a different DC voltage to the first resonant element than to the second resonant element to provide the electrostatic coupling.

The invention uses the phenomena of mode localization and vibration energy confinement to provide a measure of inertial force. The change in relative displacement between the proof mass and the first resonant element alters the stiffness of the first resonant element. Unlike the conventional approach of measuring induced frequency shifts, mode-localized sensors in accordance with the invention rely on tracking shifts in relative amplitudes of vibration between two or more vibrating elements. This enhances the parametric sensitivity and in effect, the resolution of such MEMS inertial sensors. The use of electrostatic coupling between the proof mass and a first resonant element also increases sensitivity and allows for the use of high quality factor resonators, such as bulk acoustic wave type resonators, that are less affected by air damping.

BRIEF DESCRIPTION OF THE DRAWINGS

Embodiments of the present invention will now be described in detail, by way of example only, with reference to the accompanying drawings, in which.

DETAILED DESCRIPTION

Figure 1:
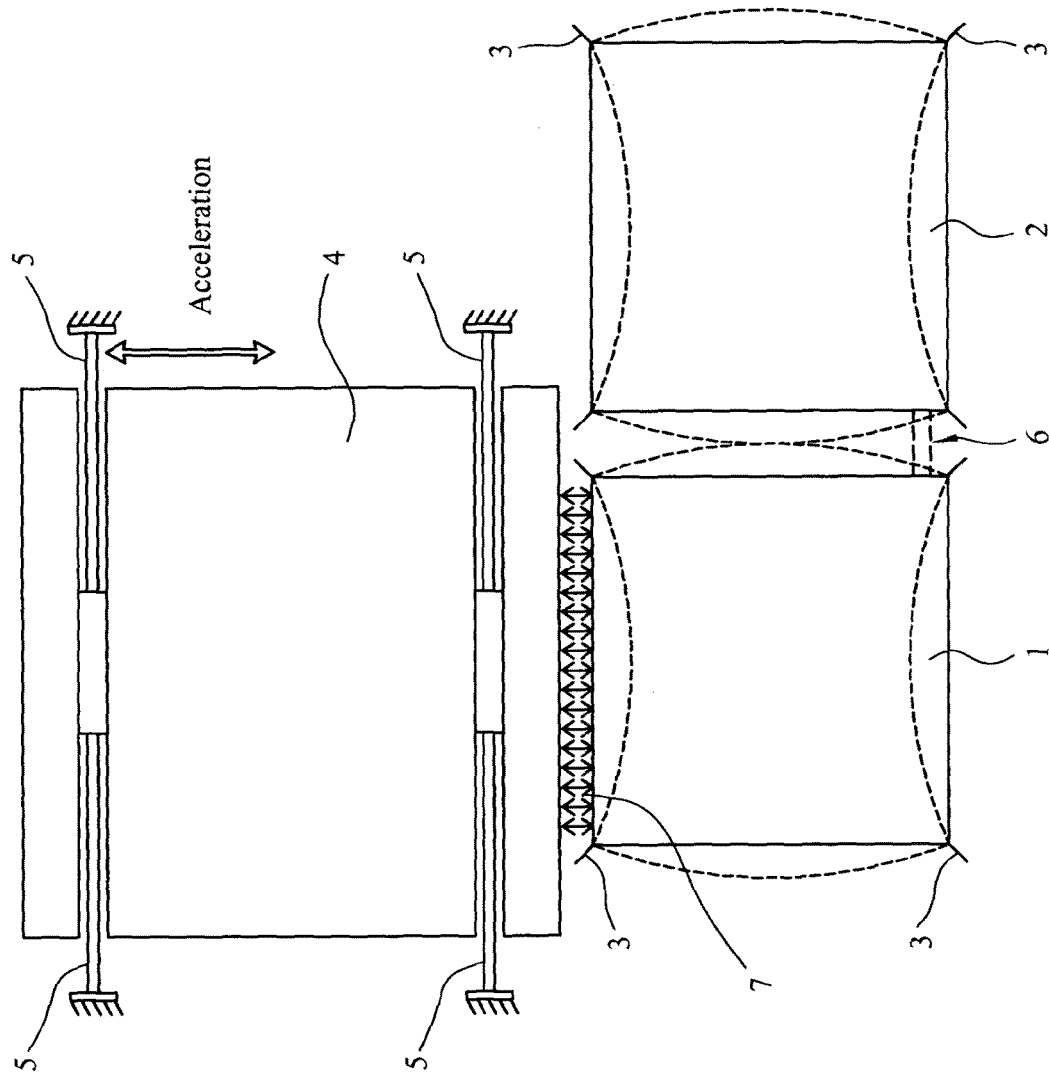
FIG. 1 is a schematic diagram of a sensor in accordance with a first embodiment of the invention.

FIG. 1 illustrates a sensor in accordance with a first embodiment of the invention. The sensor comprises two resonant elements 1, 2, which in this example are bulk acoustic wave (BAW) resonators. The two resonant elements 1, 2 are adjacent to one another and fixed to a substrate or frame by flexures 3. The first resonant element 1 is capacitively coupled to a proof mass 4, which is suspended from the frame by flexures 5. The two resonant elements are weakly coupled by a mechanical coupling element 6.

Mode localization in a device of this type may be illustrated by considering the simple case of two weakly coupled resonant elements with masses $m_1$ and $m_2$ and stiffnesses $k_1$ and $k_2$. One of the resonant elements is coupled to a proof mass by a capacitive air gap. When the two resonant elements are perfectly identical ($m_1=m_2=m$; $k_1=k_2=k$) the system is symmetric about the coupling, which has a stiffness $k_c$. When the device experiences an acceleration, the proof mass displaces by a distance X leading to a change in the capacitive air gap that separates the proof mass 4 and the first resonant element 1. This results in an electrostatic modulation of the stiffness of resonant element 1 ($k_1$) relative to that of resonant element 2, consequently perturbing the structural periodicity and inducing vibration mode localization in the coupled resonating units. The resulting change in the stiffness of resonant element 1 may be expressed as:

$$|\Delta k_1| = \left| \frac{(\Delta V^2) \varepsilon_0 A}{(g \pm X)^3} \right| \qquad (1)$$

Where $\Delta V$ represents the difference in potential between the proof mass and resonator 1; $\varepsilon_0$ denotes the permittivity of air; A, the capacitive area between resonator 1 and the proof mass and g, the capacitive air gap between the proof mass and resonator 1 before any displacement of the proof mass.

The relative shift in the eigenstates due to a electrostatically modulated change in stiffness on the resonant element connected to the proof mass of ($\Delta k_1$) is given by:

$$\frac{\Delta u}{u^0} \cong \frac{\Delta k_1}{4 k_c}. \qquad (2)$$

A detailed explanation of mode localization in this type of system can be found in "Enhancing Parametric Sensitivity in Electrically Coupled MEMS Resonators" by Pradyumna Thiruvenkatanathan et al. Journal of Microelectromechanical Systems, Vol. 18, No. 5, October 2009. Comparing equation (1) with the conventional approach of measuring relative shift in the resonant frequency (equation (2) below), it can be observed that for any value of $k_c<(k/2)$, the relative shift in the eigenstate is greater than that of the resonant frequency:

$$\frac{\Delta f}{f^0} \cong \frac{\Delta k_1}{2k} \qquad (3)$$

This critical dependence of parametric sensitivity on the strength of internal coupling ($k_c$) can be exploited to enhance the performance and in effect, the resolution of such sensors. Furthermore, since the eigenstates are deduced from the amplitudes of vibration of both the coupled resonators at the eigenvalues, any effects on the stiffness due to ambient environmental fluctuations (e.g. temperature) affect both the identical resonators to the same extent, thereby leading to a common mode cancellation of these effects to the first order. However, any changes in the stiffness on one of the resonators relative to the other (differential mode), leads to significant shifts in the eigenstates under conditions of weak internal coupling as expressed in equation (2). Such a common mode rejection capability enables the realization of inertial sensors that are orders of magnitude more sensitive to the measurand alone without employing any active/passive control or compensation techniques, making this form of sensing particularly attractive over the more conventional resonant frequency based sensing approach.

The features and operation of the sensor in FIG. 1 will now be described in more detail. The resonant elements 1, 2 are silicon BAW resonators. The resonant elements are identical to one another to within manufacturing tolerances. The coupling element 6 is also formed of silicon. The dotted lines in FIG. 1 illustrate the mode of vibration of each resonant element (but not to scale).

The resonant elements can be made to resonate using several different alternative techniques. In a preferred embodiment the resonant elements are made to resonate using an electrostatic technique, by the application of an alternating voltage to a drive electrode on the frame, at the sides of the resonant elements close to the coupling 6, as is explained in detail with reference to FIG. 8.

The mechanical coupling is located close to or at a point of attachment of the resonant elements to the frame 8. The reason for this is that the potential energy contribution is largest near the stationary parts of the resonant elements, so that the mechanical coupling in that position mimics the behaviour of a spring without adding any additional mass to the system. So the mechanical coupling under such conditions can be modelled as a spring alone.

Electrostatic modulation of the stiffness of the first resonant element 1 applied by the accelerating proof mass 4 in the drive direction leads to a localisation of the vibration mode in one or other of the resonating elements 1, 2, as explained above. In order to quantify the localisation the amplitude of vibration of one or both of the resonant elements is measured. The amplitude of vibration of each of the resonating elements may be measured and the amplitude ratio calculated to provide an output indicative of the acceleration on the proof mass. However, more preferably, the amplitude of vibration of one of the resonant elements is held constant using a feedback loop and the amplitude of vibration of the other resonant element measured to quantify the extent of mode localisation and hence obtain a measure of acceleration.

In order to measure the amplitude of vibration several different techniques may be used such as optical or electro-magnetic measurement. However, in this embodiment, sense electrodes 83, 84 are provided for capacitive sensing, as explained in detail with reference to FIG. 8.

The sensor of FIG. 1 is advantageously fabricated entirely from a single semiconductor wafer, such as a silicon-on-insulator (SOI) wafer and can be fabricated using convention MEMS fabrication techniques, such as etching. This includes the frame, the resonant elements 1, 2, the proof mass 4, and the flexures 3, 5. The dimensions of the sensor components will vary depending on the application and technology/process constraints. The larger the proof mass area, the larger the communicated inertial force when subjected to an acceleration. This consequently, results in a larger output variation. However, smaller the capacitive coupling gap between the proof mass and the resonator, the larger the variation in the capacitance modulated spring constant that translates into an eigenstate variation in the sensor. Hence, in a preferred embodiment, the proof mass is designed to have a large area but the gap coupling the proof mass to one of the resonant elements is designed to be as small as possible with the fabrication process chosen.

Figure 2:
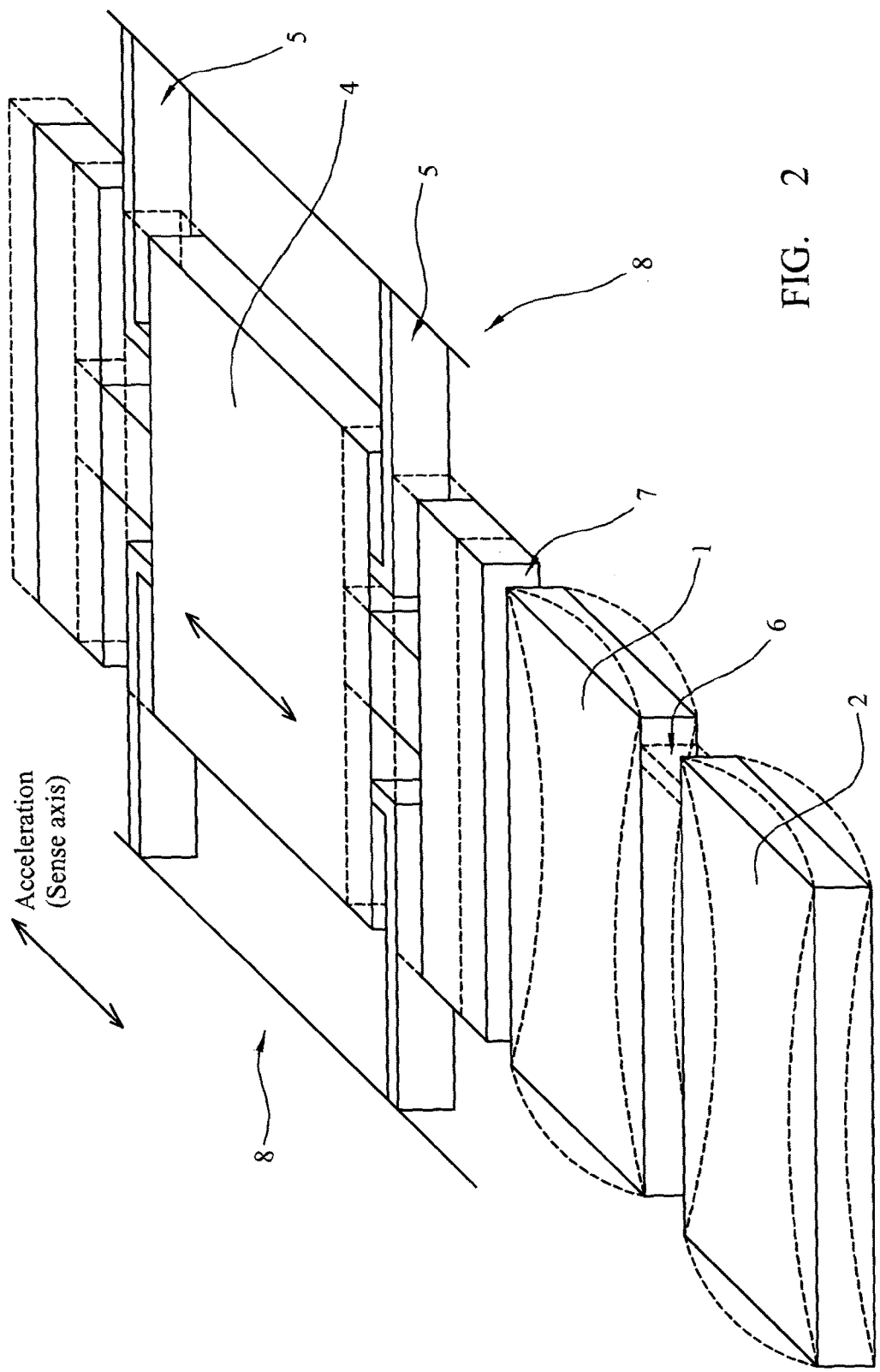
FIG. 2 is a schematic perspective view of the sensor in accordance with a second embodiment of the invention.

FIG. 2 is a perspective view of a sensor of the type shown in FIG. 1, but with the resonant elements 1, 2 arranged with the second resonant element 2 on the opposite side of the first resonant element 1 to the proof mass 4. The frame 8 is partially shown. The dotted lines show (not to scale) a position of the proof mass 4 when subjected to an inertial force in the sense direction and the deformation of the resonant elements during oscillation.

Figure 3:
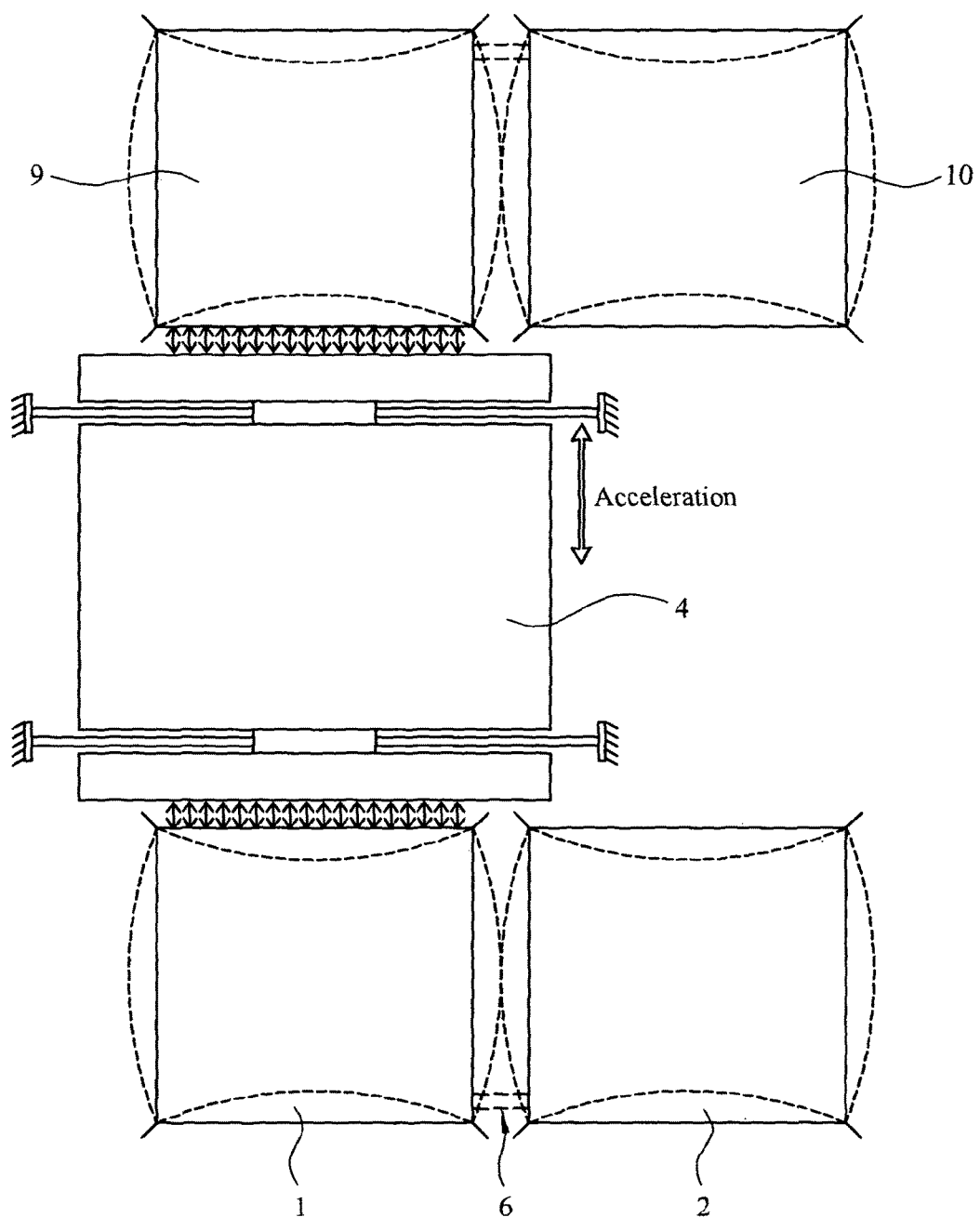
FIG. 3 is a schematic diagram of a sensor in accordance with a third embodiment of the invention.

FIG. 3 shows a device of the type shown in FIG. 1 but with resonant elements on opposite sides of the proof mass. Resonant element 9 is electrostatically coupled to the proof mass 4. Resonant element 10 is coupled to resonant element 9. Resonant elements 9 and 10 are identical (within manufacturing error) to resonant elements 1 and 2. This provides the possibility of a differential output, reducing measurement error, or alternatively can provide for redundancy.

Figure 4:
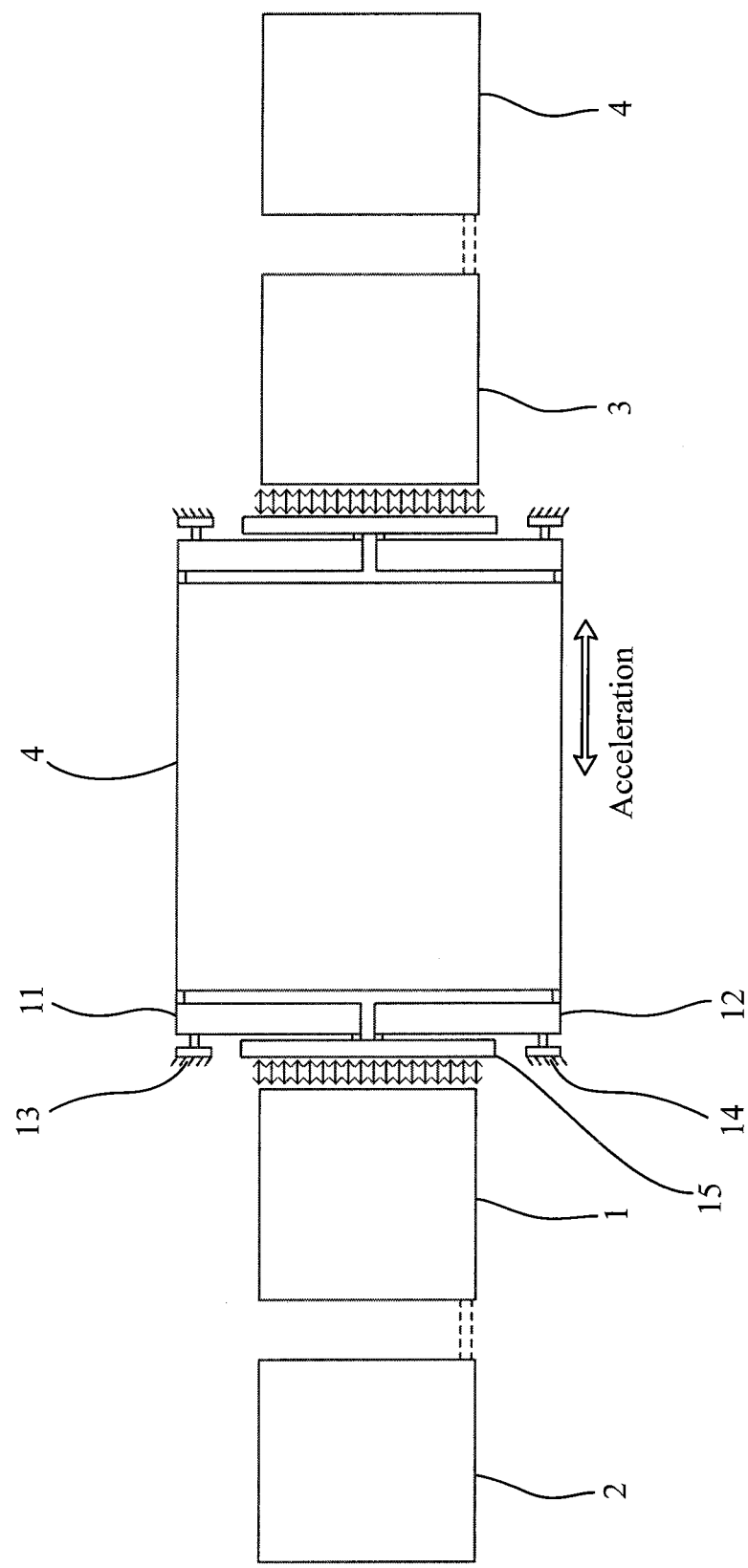
FIG. 4 shows another example of a sensor in accordance with the invention, using micro-levers to amplify the displacement measurement.

FIG. 4 shows a modification to a device of the type shown in FIGS. 1 to 3. The sensor of FIG. 4 includes micro-levers 11, 12 between the main body of the proof mass 4 and an additional portion of the proof mass 15 adjacent to the first resonant element 1. The micro-levers 11, 12 pivot about fulcrums 13 and 14 respectively. The fulcrums 13 and 14 are positioned closer to the connection to the main body of the proof mass 4 than to resonant element 1, thereby amplifying the displacement of the additional portion 15 relative to the resonant element 1. An identical arrangement of micro-levers is provided on the opposite side of the proof mass. Micro-levers of this type are described in greater detail in U.S. Pat. No. 5,969,249.

FIGS. 1 to 4 shows the sensor arrangement in which the resonant elements are weakly coupled using a mechanical coupling. But it is possible to use an electrostatic coupling between the resonant elements instead of a mechanical coupling. An electrostatic coupling is provided by including coupling electrodes on each of the resonant elements, directly opposing each other and leaving a small (for example approximately 2 μm) coupling gap. Different DC voltages are applied to each coupling electrode using separate drive electrodes to create an attractive force between the two resonant elements. The electrostatic attraction of one resonant element to the next, results in mechanical spring like behaviour. It results, in effect, in a negative electrostatic spring between the two resonant elements.

The use of electrostatic coupling between the resonant elements has two significant advantages. Firstly, it provides for a tuneable coupling and a significantly weaker coupling than is possible with a mechanical coupling. The weaker the coupling the more pronounced the localisation effect and so the higher resolution the sensor can be made. Secondly, the different DC voltages can be used to compensate for any mechanical asymmetry. Applying different DC voltages to the resonant elements shifts their individual effective stiffness. This would disrupt the initial mechanical symmetry of the sensor. A way to avoid this is to apply DC voltages of equal absolute value but opposite polarity to the two resonant elements. Small differences in the absolute values of their DC voltages can be used to then compensate for any mechanical asymmetry.

Figure 5:
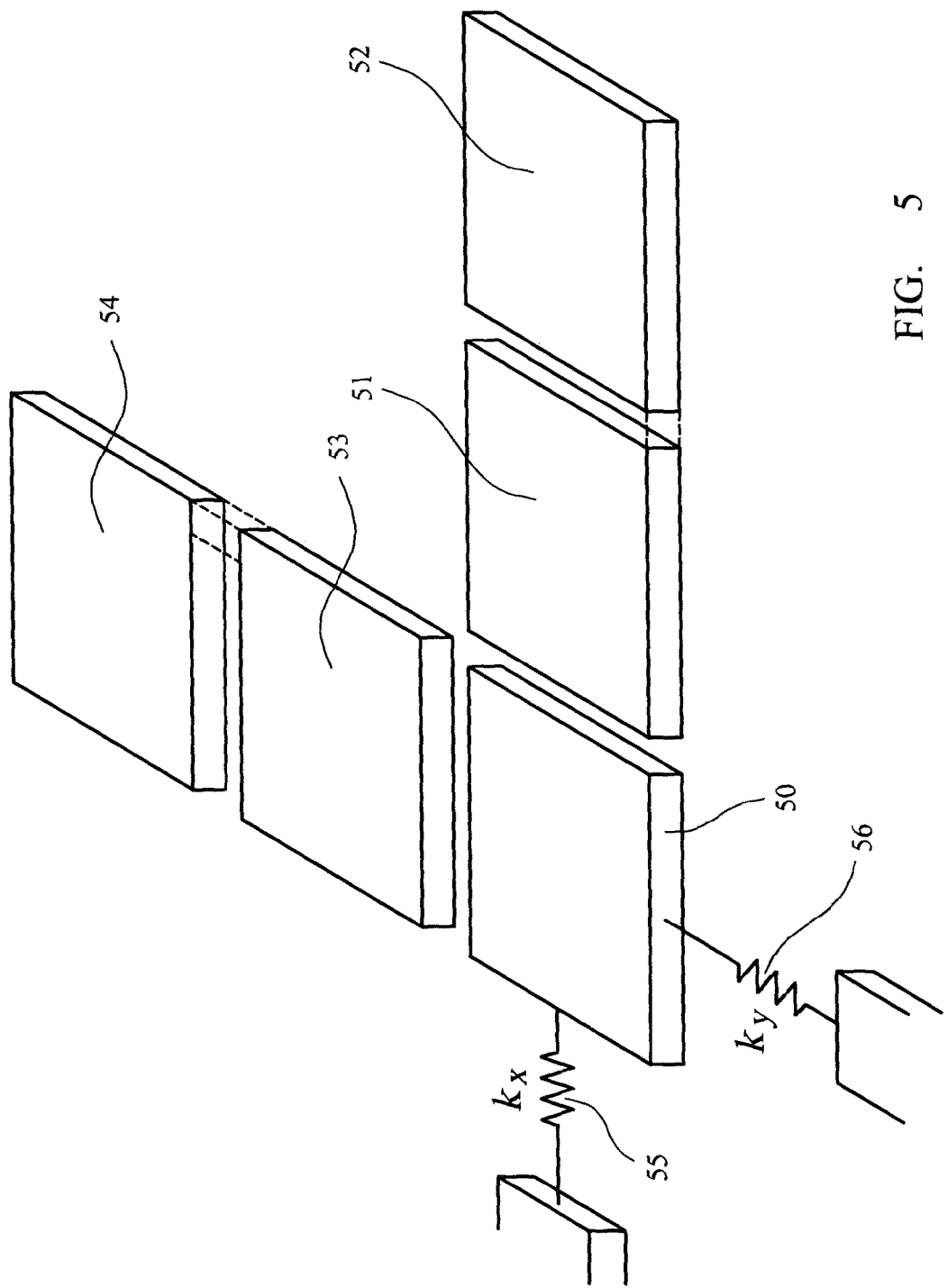
FIG. 5 a schematic illustration of an accelerometer with two orthogonal axes of sensitivity in accordance with the invention.
Figure 6:
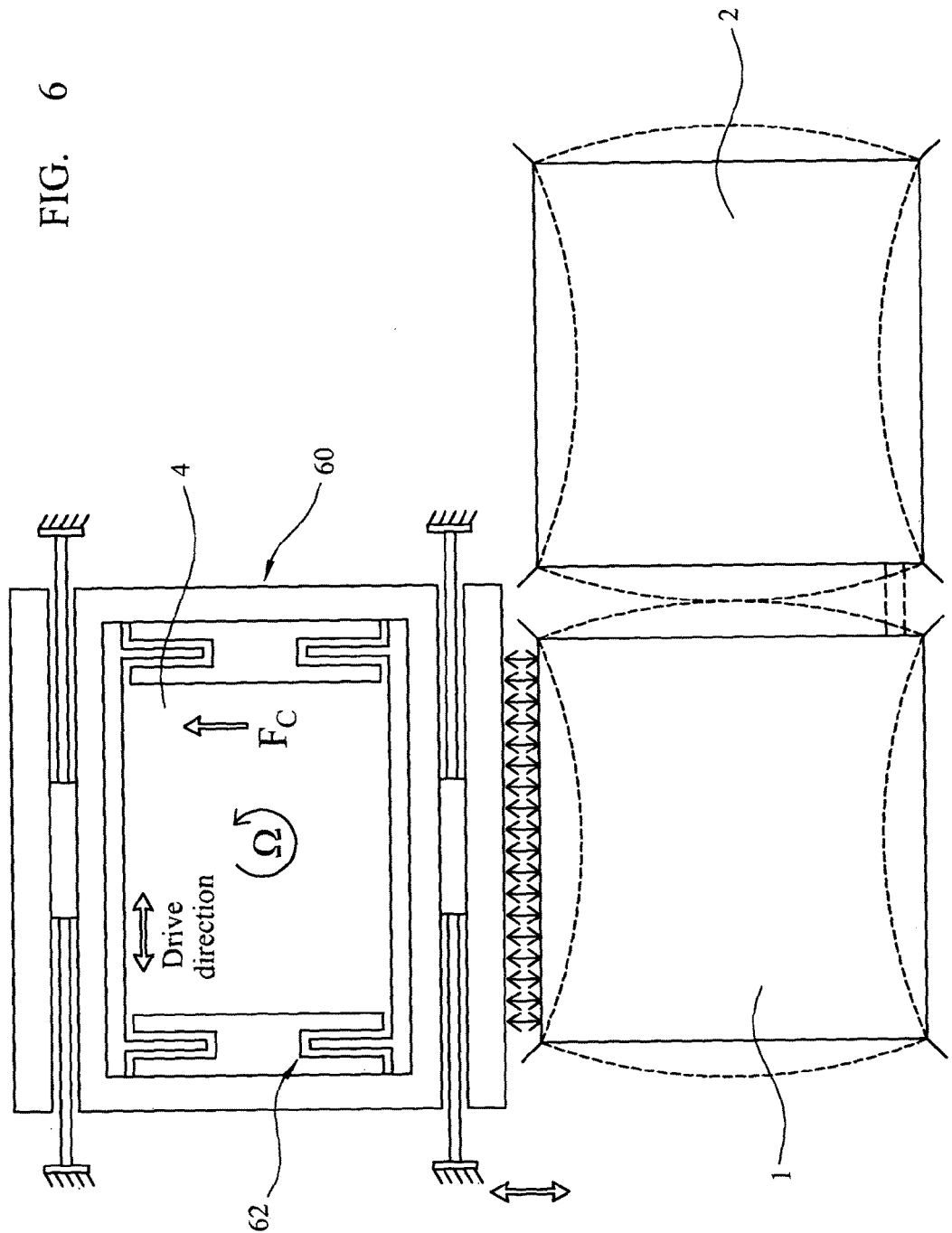
FIG. 6 is a schematic illustration of a gyroscope in accordance with the invention.

FIG. 5 is a schematic, cut away, perspective view of an inertial sensor providing sensing in two dimensions. A proof mass 50 is electrostatically coupled to two orthogonally disposed pairs of coupled resonant elements 51, 52, 53, 54 which are each coupled to frame. Only one resonant element in each pair 51, 53, is electrostatically coupled to the proof mass 50. The suspension of the proof mass is schematically illustrated as springs 55, 56, with stiffness $k_x$ and $k_y$. The same basic arrangement can be extended to provide for sensing in three dimensions, The inertial sensors described with reference to FIGS. 1 to 5 are accelerometers. FIG. 6 is a schematic illustration of a gyroscope in accordance with the present invention, operating on the same principle. The sensor includes two masses: —a vibrating proof mass 4 that is allowed to displace in a direction orthogonal to the drive axis; and a suspended frame 60 that is connected to the proof mass by drive flexures 62 in a manner that does not transmit motion in the drive direction (shown as the y axis) but allows the motion due to the 'Coriolis force' to couple along the sense axis (shown as the x axis). One of two weakly coupled resonators 1 is capacitively coupled to the suspended frame 60. Any motion of the frame 60 due to an induced Coriolis force results in a change in stiffness of the resonant element 1 that is coupled to the frame, while the other resonant element 2 undergoes no stiffness modulation. This, in turn, localizes the coupled vibration modes of the resonant elements as previously described. The resulting large variations in the relative modal amplitudes may be measured to get a direct estimate of the inertial Coriolis force and, in consequence, the applied rotation, in the same manner as described above. The use of micro-levers, as described with reference to FIG. 4, may also be applied to the gyroscope design to improve measurement sensitivity.

Figure 7:
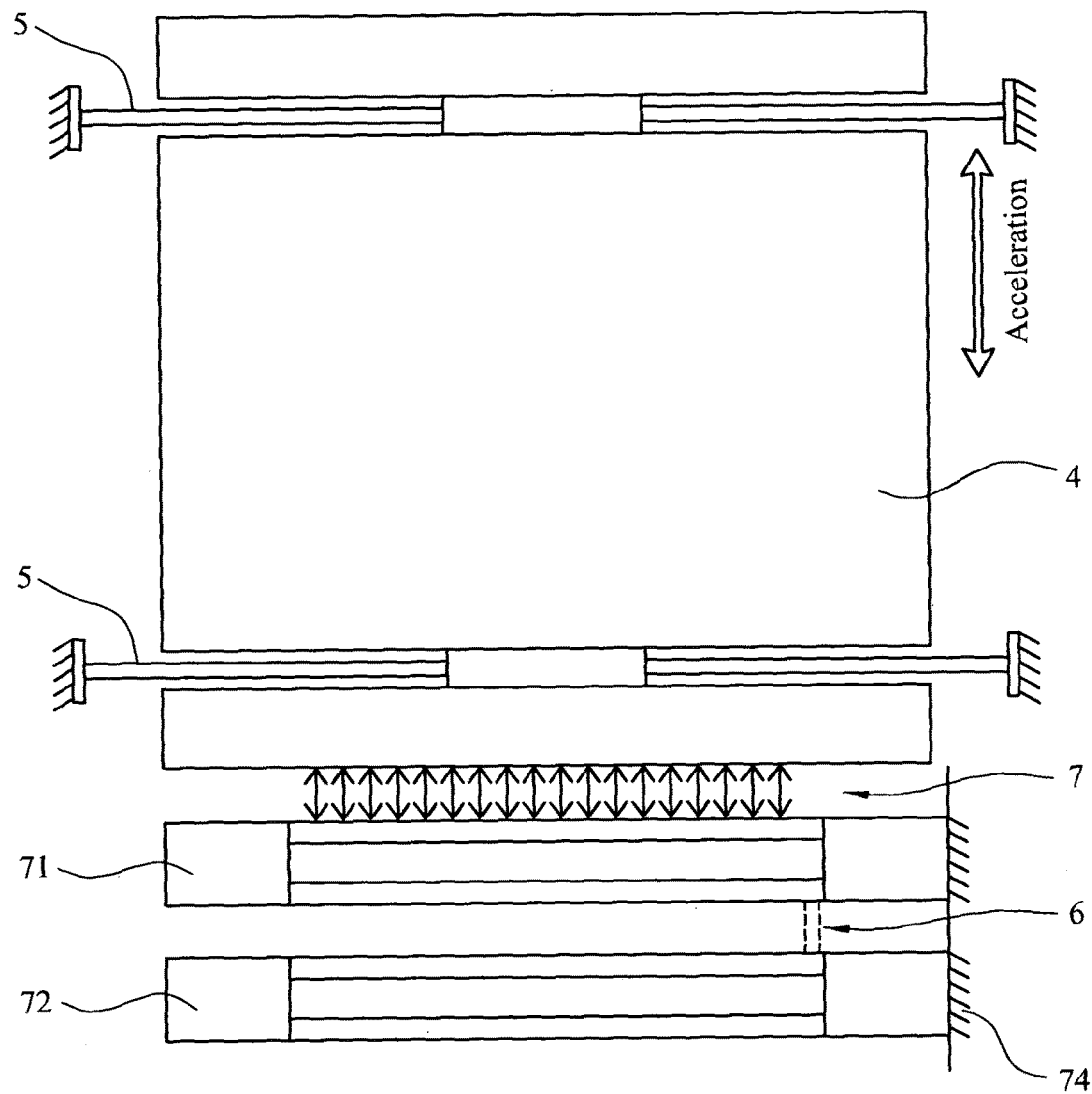
FIG. 7 is a schematic diagram of a sensor in accordance with a further embodiment of the invention.

FIG. 7 illustrates a sensor assembly similar to that shown in FIG. 1, but using double ended tuning fork (DETF) resonators as the first and second resonant elements rather than BAW resonators. The sensor of FIG. 7 comprises a proof mass 4, suspended from a frame by flexures 5 and first and second resonant elements 71 and 72 fixed to the frame and coupled to one another by a weak mechanical coupling 73, which is positioned close to the frame 74. The mechanical coupling 73 is positioned close to the frame as this where the potential energy contribution is highest, so that the mechanical coupling in that position mimics the behaviour of a spring without adding significant mass to the system. The first resonant element 71 is arranged with a long edge adjacent to the proof mass, being separated from the proof mass by a small capacitive air gap 75. The first resonant element is thereby capacitively coupled to the proof mass 4 and will undergo changes in effective stiffness as the proof mass 4 is displaced relative to it. The sensor of FIG. 7 operates in the same manner as the sensors illustrated in FIGS. 1 to 6 and can be driven using electrodes in the same manner, as is described with reference to FIG. 8. Micro-levers can also be employed in the sensor of FIG. 7 in the same manner as described with reference to FIG. 4.

Figure 8:
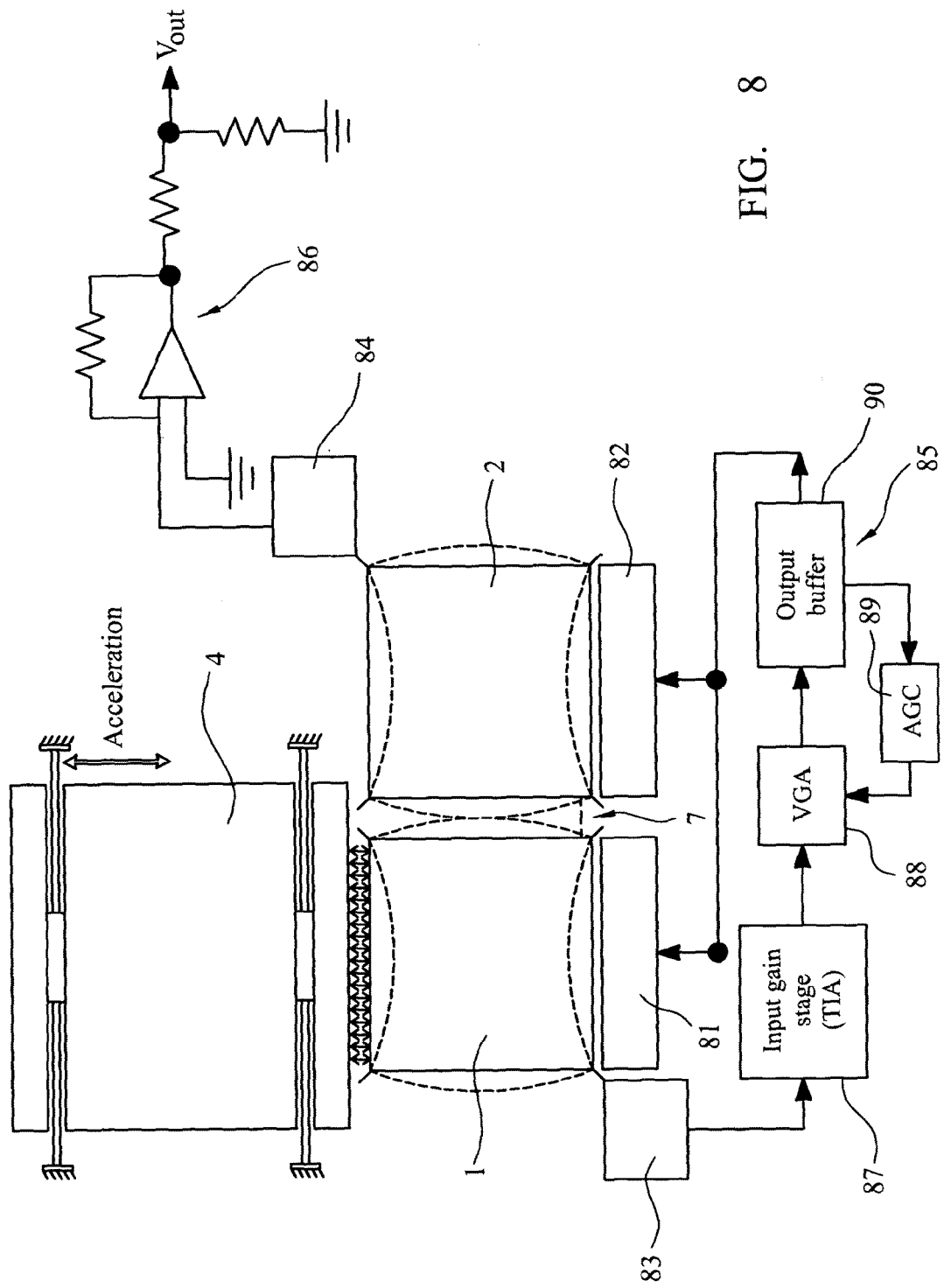
FIG. 8 is a schematic diagram of the drive and processing elements of a sensor in accordance with an embodiment of the invention.

FIG. 8 illustrates the drive and processing electronics of a sensor in accordance with an embodiment of the present invention. FIG. 8 illustrates an electrostatic coupling between the two resonant elements. However, the circuit configuration shown in FIG. 8 could equally be used with a mechanical coupling by providing the same DC voltage to each drive electrode. The first and second resonant elements 1 and 2 are driven by an AC voltage signal from two separate drive electrodes 81 and 82. The same AC signal is applied to each drive electrode but a different DC bias voltage is provided to each electrode to provide electrostatic coupling between the resonant elements. As explained, the DC bias voltages for electrostatic coupling are chosen appropriately to bias the resonators in the desired operating region (including an initially symmetric configuration). DC bias voltages $V_{dc1}$ and $V_{dc2}$ are applied to sense electrodes 83 and 84. The amplitude of oscillation of the first resonant element 1 is maintained at a constant level by sensing off electrode 83. The output from electrode 83 is fed into a control circuit 85, and the output of the control circuit 85 fed back to drive electrodes 81 and 82. The first stage of the circuit 85 is a gain element 87 that provides a fairly large initial gain before feeding the signal into a variable gain amplifier (VGA) 88. The VGA 88 consists of an amplifier that adjusts its gain in accordance to a control signal (from an automatic gain control (AGC) circuit 89) and feeds the output to a buffer amplifier 90. The AGC 89 consists of a circuit that detects the output of the first stage gain element using a peak detector (that compares the peak amplitude of the output arising from the first gain stage with that of a reference signal) and accordingly controls the gain of the first stage gain element to maintain the output at a constant peak amplitude. The controlled output signal from the buffer element is, in turn, used to drive the resonant elements in the chosen mode of oscillation. The modal amplitudes of the second resonator (at the resonant mode wherein the oscillations are sustained) is then read out from sense electrode 84.

Sensing of the amplitude of vibration may be implemented in several ways. In the embodiment shown in FIG. 8, the sensing of the amplitude of vibration of the first and second resonant elements may be achieved by measuring the motional current of the resonant elements as they oscillate from the sensing electrodes 83 and 84 respectively. Silicon also exhibits a strong piezoresistive effect, so the resistance of a silicon resonant element will change as it oscillates which may also be used as an alternative readout mechanism. Alternatively, the sensing means may comprise electrodes mounted adjacent to the first and second resonant elements to allow for capacitive sensing. Other possibilities for the sensing means include optical sensing of the oscillation of the first resonant element or even electro-magnetic transduction.

The output from the sense electrode 84 is fed into a trans-resistance amplifier circuit 86 to convert the current signal from electrode 84 into a voltage signal that may be used to directly calculate an amplified measure of the modal amplitude variation of the second resonator, from which any induced changes in the stiffness of the first resonant element 1 may be evaluated using equation (2) above. From the change in stiffness, displacement of the proof mass can be derived from equation (1) and from that acceleration or angular velocity can be determined.

Figure 9:
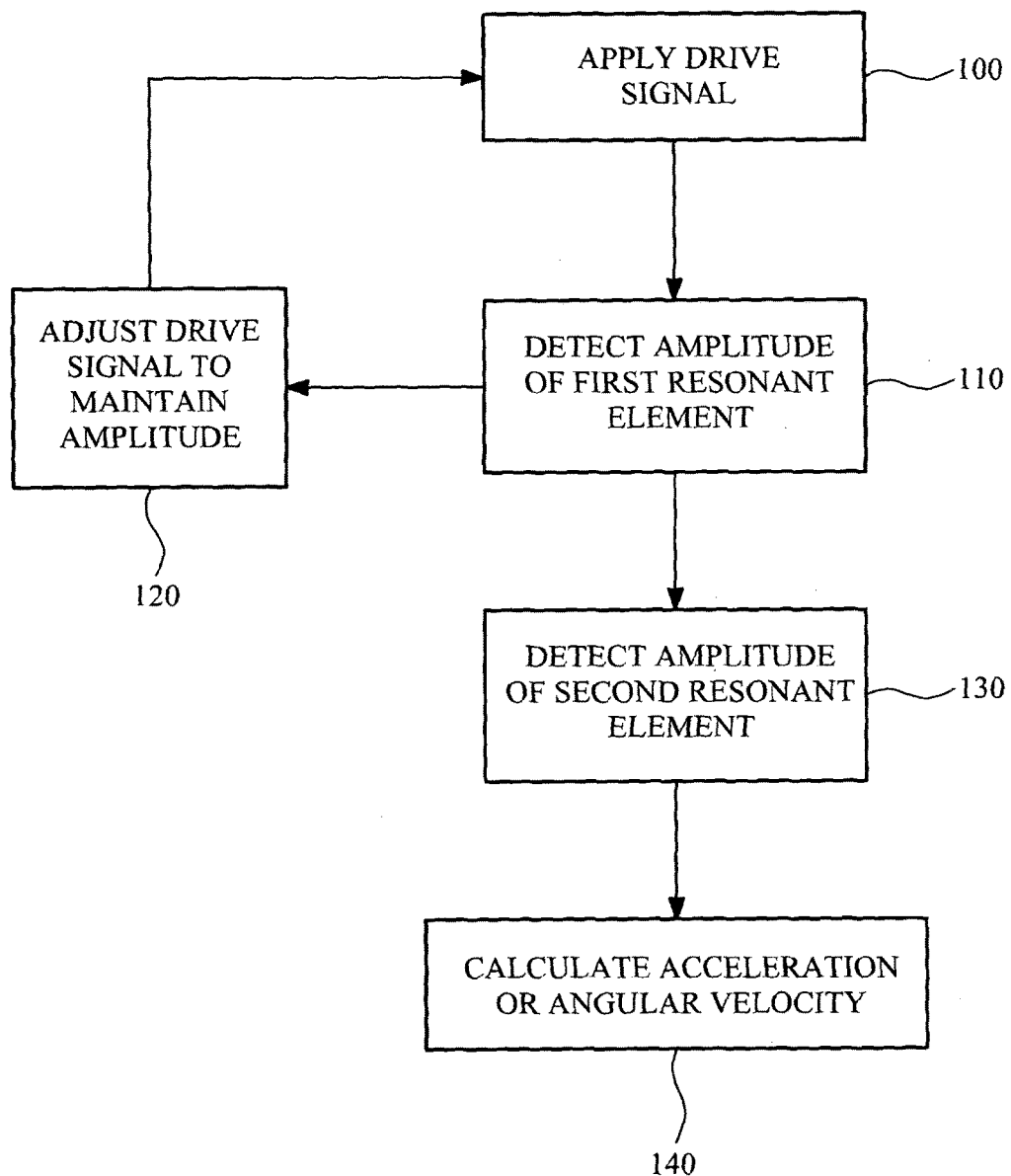
FIG. 9 is a flow diagram illustrating a method of sensing in accordance with the invention.

FIG. 9 is a flow diagram, illustrating the steps carried out in a method in accordance with the present invention using an inertial sensor of the type described above with reference to FIGS. 1 to 8. In a first step, step 100, the resonant elements are caused to vibrate in a resonant mode using a drive signal. As described above the drive signal may comprise an AC voltage applied to the resonant elements and a DC biasing voltage applied to adjacent electrodes. In step 110, the amplitude of vibration of the first resonant element is detected. In step 120 the drive signal is adjusted to maintain the amplitude of the first resonant element at a constant level using a feedback loop. The amplitude of vibration of the second resonant element is detected in step 130 to provide a measure of the change in effective stiffness of the first resonant element, from which the acceleration or angular velocity of the proof mass along the axis of sensitivity can be determined in step 140.

It is possible to use more than two coupled resonant elements. For example three or four coupled resonant elements may be used in a chain, with only one resonant element coupled to the proof mass. A larger number of resonant elements increases the degree of localisation of the mode energy and so, in theory, may be used to enhance sensitivity of the sensor. However, each additional resonant element introduces additional complexity in the interface and signal processing electronics, as well as imposing stricter demands on the fabrication tolerances.

The invention claimed is:

1. An inertial sensor comprising:
   a frame;
   a proof mass suspended from the frame by at least one flexure;
   a first resonant element, the first resonant element being fixed to the frame and electrostatically coupled to the proof mass;
   a second resonant element, the second resonant element being fixed to the frame, adjacent to the first resonant element such that there is substantially no electrostatic coupling between the second resonant element and the proof mass;
   a coupling between the first resonant element and the second resonant element;
   a drive means coupled to the first and second resonant elements for vibrating the first and second resonant elements; and
   a sensor assembly for detecting the amplitude of vibration of at least one of the resonant elements.

2. An inertial sensor according to claim 1, wherein the first and second resonant elements are bulk acoustic resonators.

3. An inertial sensor according to claim 1, wherein the means for coupling the first resonant element to the second resonant element is an electrostatic coupling means.

4. An inertial sensor according to claim 3, wherein the electrostatic coupling means is a pair of plates, one plate in the pair of plates coupled to or forming part of the first resonant element and the other plate in the pair of plates coupled to or forming part of the second resonant element, and a voltage source connected to the pair of plates for applying a voltage difference between the plates.

5. An inertial sensor according to claim 1, wherein the means for coupling is a mechanical linkage between the first resonant element and the second resonant element coupled to the first resonant element at a position between the proximal and distal ends of the first resonant element and coupled to the second resonant element at a position between the proximal and distal ends of second resonating element.

6. An inertial sensor according to claim 1, wherein the means for coupling has an effective stiffness of less than half of the stiffness of both the first and second resonant elements.

7. An inertial sensor according to claim 1, wherein the first and second resonant elements are of substantially the same dimensions and material properties.

8. An inertial sensor according to claim 1, wherein the sensor assembly comprises electrical sensors positioned adjacent the first and second resonant elements.

9. An inertial sensor according to claim 1, wherein the drive means comprises a first drive electrode coupled to the first resonant element for exciting the first resonant element.

10. An inertial sensor according to claim 9, wherein the drive means further comprises a second drive electrode coupled to the second resonant element for exciting the second resonant element.

11. An inertial sensor according to claim 1, wherein the drive means includes a feedback loop to maintain an amplitude of vibration of one of the first or second resonant elements at a constant level, and wherein the sensor assembly is configured to detect the amplitude of vibration of the other of the first and second resonant elements.

12. An inertial sensor according to claim 1, further comprising at least one lever to amplify displacement of a portion of the proof mass relative to the first resonant element.

13. An inertial sensor according to claim 1, further comprising at least one additional resonant element fixed to the frame, and an additional coupling means coupling the additional resonant element to the first resonant element or the second resonant element.

14. An inertial sensor according to claim 1, further comprising a third resonant element fixed to the frame and electrostatically coupled to the proof mass;
a fourth resonant element having a proximal end and a distal end, the fourth resonant element being fixed to the frame, adjacent to the third resonant element; and
a second means for coupling the third resonant element to the fourth resonant element;
wherein the third resonant element extends from the proof mass in the same direction or an orthogonal direction orthogonal to the direction at which the first resonant element extends from the proof mass.

15. An inertial sensor according to claim 1, wherein the inertial sensor is configured as an accelerometer.

16. An inertial sensor according to claim 1, wherein the inertial sensor is configured as a gyroscope and wherein the proof mass is coupled to the first resonant element by an intermediate frame, the intermediate frame being coupled to the first resonant element by flexures that transmit movement resulting from a Coriolis force on the proof mass orthogonal to a drive direction.

17. A method of inertial sensing using a sensor comprising a proof mass coupled to a first resonant element, wherein a second resonant element is coupled to the first resonant element but not to the proof mass, comprising the steps of:
oscillating the first and second resonant elements with a drive signal of the same frequency and amplitude;
detecting an amplitude of oscillation of one of the first or second resonant elements at resonance;
adjusting the drive signal to maintain the amplitude of oscillation of one of the first and second resonant elements at a constant amplitude;
detecting an amplitude of oscillation of the other of the first and second resonant elements at resonance; and
determining the displacement of the proof mass based on the amplitude of the other of the first and second resonant elements.

18. A method according to claim 17, wherein the means for coupling the first resonant element to the second resonant element is an electrostatic coupling, further comprising the step of applying a different DC voltage to the first resonant element than to the second resonant element to provide the electrostatic coupling.

* * * * *